Patented Aug. 24, 1937

2,091,121

UNITED STATES PATENT OFFICE 2,091,121

DRY CLEANING EMULSION

Samuel Lenher and Luther B. Arnold, Jr., Wilmington, Del., assignors to E. I. du Pont de Nemours & Company, Wilmington, Del., a corporation of Delaware No Drawing. Application September 12, 1934, Serial No. 743,719

8 Claims. (Cl. 87—5)

This invention relates to new and improved emulsifying agents and more particularly refers to the production of stable emulsions of mineral, vegetable, animal and synthetic oils, fats and waxes.

It is an object of this invention to produce materials capable of forming stable emulsions. Another object is to make oil-soluble compounds of particular value in the manufacture of self-emulsifying oils. Still another object is to produce new wetting, detergent, and dispersing agents. A further object is to produce emulsions which are suitable for use in the numerous processes wherein emulsions of oil-like materials have been utilized heretofore. A still further object is to produce emulsions which are particularly adapted for use in the textile, leather, paper, pharmaceutical and allied fields. An additional object is to produce improved water-in-oil emulsions especially suited for use in the dry cleaning field. Additional objects will become apparent from a consideration of the following description and claims.

These objects are attained according to the herein described invention wherein sulfonated derivatives of long chain hydrocarbons are substantially freed from inorganic salts with which they are usually associated, and the resulting products utilized as emulsifying agents. In a more restricted form the invention pertains to the use as emulsifying agents of oil-soluble sulfate ester salts of normal primary alcohols containing from twelve to eighteen carbon atoms which have been substantially freed of inorganic salts. The preferred embodiment of this invention relates to the formation of self-emulsifying oils by adding to oil-like materials an oil-soluble sulfate ester salt of oleyl alcohol which has been subjected to acetylation prior to sulfonation, and which is substantially dehydrated and likewise is substantially free from inorganic salts.

The invention may be more readily understood by a consideration of the following illustrative examples:

Example 1

(a) The sodium sulfate salt of oleyl alcohol which had been treated with acetic anhydride prior to sulfonation and neutralization was heated slowly until the temperature reached 125° C., the liquid being vigorously agitated during this treatment. After the temperature passed 90° C. the liquid foamed violently while the water was boiling off. Agitation was sufficient to allow the water to boil off evenly without bumping, as well as to prevent local overheating. When the temperature reached 120–125° C. foaming ceased indicating that the water had completely boiled off. In order to prevent decomposition of the ester salt under treatment care was taken that the temperature did not exceed 130° C. The product was then cooled to 20–25° C. and filtered to remove therefrom inorganic salts. The filtrate was a cloudy, heavy, viscous, mahogany colored liquid. Quantitative measurements carried out during the aforementioned treatment indicated that from 30–35% of water was driven off on heating, and up to 5% of inorganic salts were removed upon filtering, the aforementioned percentages being by weight and based upon the starting material.

(b) 4 parts of the ester selected as a starting material in (a) supra were mixed with one part of technical oleyl alcohol, comprising chiefly oleyl alcohol in admixture with small amounts of cetyl and stearyl alcohols. The steps previously referred to in (a) were repeated resulting in the production of a clear mahogany colored liquid. This liquid on standing at 20–25° C. became somewhat cloudy. The oleyl alcohol content of the final product was 28–30% by weight. It was found that the presence of oleyl alcohol made the control of conditions during heating and filtering appreciably easier.

The products produced according to the above instructions were used as emulsifying agents in the following examples.

Example 2

3 parts of the product produced in (a) supra were mixed with one part of technical oleyl alcohol and 396 parts of light mineral oil 30 sec. Saybolt.

A self-emulsifying oil resulted therefrom which was used for lubricating vegetable, animal and synthetic fibers during spinning and weaving operations. It was found that this lubricating agent was readily removed from the fibers by means of a water bath without the addition of emulsifying agents, detergents or solvents to the bath. The treated fibers were readily dyed after a simple rinsing operation, no oil spots being detected on the dyed material.

The product produced in (b) supra was substituted for the product produced in (a) in the above example. The self-emulsifying oil resulting therefrom was used in textile spinning and weaving operations. Here again, the results were surprisingly good and the processed textile materials were speedily and efficiently freed of the lubricant by passing through a water bath.

Example 3

10 parts of the product produced in (a) supra were mixed with 10 parts of technical oleyl alcohol and 80 parts of White Rose oil—100–110 sec. Saybolt. The self-emulsifying oil produced thereby was used for the same purposes as the lubricant referred to in the previous example. The water emulsions formed thereby were very stable, and did not require the assistance of further emulsifying agents, alkalies or detergents. Also, the treated fibers were considerably softer and more pleasant to the touch than fibers treated with the customary emulsifying agents.

As textile treating agents the following mixtures were used:

| | Parts |
|---|---|
| Technical stearyl alcohol | 1 |
| Product produced in (a) supra | 4 |
| | |
| Product produced in (a) supra | 3 |
| Technical lauryl alcohol | 1 |
| Stoddard solvent | 96 |
| | |
| Product produced in (a) supra | 3 |
| Technical stearyl alcohol | 1 |
| Stoddard solvent | 96 |

The above formulas imparted a soft pleasant handle to the fibers. In addition, the latter two formulas were exceedingly good detergent and finishing agents, due probably to the presence therein of the organic solvent. In place of or in addition to the Stoddard solvent referred to in the aforesaid formulas other organic solvents or mixtures thereof such as trichlorethylene, halogenated hydrocarbons, etc. may be used.

Example 4

A dry cleaning agent was produced in accordance with the following formula:

| | Parts |
|---|---|
| Product produced in (a) | 3.3 |
| Technical oleyl alcohol | 3.7 |
| Water | 1.2 |
| Stoddard solvent | 91.8 |

The above mixture was quite satisfactory in the dry cleaning of textile materials. Water was dispersed throughout this mixture in a very stable form, and permitted the removal of water-soluble stains from the material being cleaned. The presence of the organic solvent caused the removal of stains which were insoluble in water. As a result of this mixture both water-soluble and water-insoluble stains were completely removed from the various textile materials cleaned therewith.

Example 5

The following formula was substituted in dry cleaning operations for the one described in the previous example:

| | Parts |
|---|---|
| Product produced in (a) Example 1 | 1.35 |
| Technical oleyl alcohol | 0.45 |
| Water | 0.65 |
| Trichlor-ethylene | 98.55 |

The results produced by this formula were comparable with those produced in the preceding example. The cleaned fabrics possessed a soft finish and were entirely free from water- and oil-soluble stains.

Example 6

A soluble cutting oil was made by extending the following mixture with water:

| | Parts |
|---|---|
| Product produced in Example 1 (a) | 15 |
| Technical oleyl alcohol | 5 |
| Spindle oil | 80 |

Example 7

A wire drawing lubricant was produced by extending the following mixture with water:

| | Parts |
|---|---|
| Product produced in (a) Example 1 | 8 |
| Technical oleyl alcohol | 92 |

The above formulation was readily extended in water to an extent wherein the oleyl alcohol was present in concentrations varying from 0.1 to 2.0%. The extended product had valuable lubricating properties in wire drawing machines utilizing either diamond or metal dies. The aforementioned lubricant may have added thereto any of the customary boundary or extreme pressure lubricants, where desired.

Example 8

In place of the lubricant referred to in the preceding example the following metal processing lubricant was used:

| | Parts |
|---|---|
| Product produced in (a) Example 1 | 4 |
| Technical ethyl alcohol | 10 |
| Technical oleyl alcohol | 86 |

It is to be understood that the aforementioned examples are descriptive merely of a few of the many modifications of the present invention. In these examples, for purposes of convenience, a particular product was selected as an emulsifying agent. This product, as previously mentioned, was produced by treating oleyl alcohol with acetic anhydride, subsequently treating the resulting product with chlorsulfonic acid or similar sulfonating agent and finally forming the sodium salt of the sulfonated products. In place of such product numerous other sulfonated derivatives of hydrocarbons may be substituted therefor or used in admixture therewith. These derivatives are preferably oil-soluble sulfate ester salts of normal primary unsaturated alcohols containing from twelve to eighteen carbon atoms. In each case when such products are normally associated with varying amounts of inorganic salts such salts should be substantially removed therefrom prior to their use as emulsifying agents. The means of removing inorganic salts may vary, although it has been found that careful heating of the sulfonated derivatives in order to drive off the water therefrom without decomposing the desired products, with subsequent filtration to separate the inorganic salts therefrom is a convenient and efficient method. Substantial or complete absence of inorganic salts from the products results in a tremendous increase in the emulsifying properties thereof and in the production of textile treating and dry cleaning agents of pronounced value. Removal of the majority of water present therein likewise increases the emulsifying properties of the resulting products to a surprising extent and is understood to be the preferred embodiment of the present invention when the production of self-emulsifying oils is the object in view.

Since the preferred derivatives utilized in the present invention may be advantageously produced from normal primary unsaturated alcohols, a short description of such materials will now be given. These alcohols are readily derived from animal and vegetable oils, fats and waxes such as olive, rape seed, sperm, herring and castor oils, spermaceti, etc. The means of producing alcohols from the aforementioned or other well known sources may vary, although it is ordinarily advisable to utilize the sodium reduction or catalytic hydrogenation methods. Representative alcohols produced thereby which fall within the preferred category are oleyl, ricinoleyl and linoleyl alcohols. It is, as previously mentioned, contemplated that the present invention shall apply to lower and higher members of the aforementioned series, as well as further substituted derivatives thereof. These alcohols may be used alone or in admixture with one another in varying proportions.

After obtaining the aforementioned or related alcohols they may be sulfonated with the usual sulfonating media such as, for example, sulfur trioxide, concentrated sulfuric acid, chlorsulfonic acid, etc. Prior to the sulfonating treatment the alcohols are subjected to treatment with various materials of an acidic nature, for instance, inorganic or organic acids and their anhydrides such as boric, phosphoric, acetic, propionic, butyric, benzoic, etc. acids.

Subsequent to sulfonation the products are advisably treated with salt-forming compounds which result in the production of water-soluble salts, which are also oil-soluble when they are to be used in the production of self-emulsifying oils. Soda ash or caustic soda is preferred in this connection. However, the invention is not restricted thereto, since numerous other salt-forming compounds of inorganic or organic nature may be used. A few representative compounds coming within this category are calcium, magnesium, potassium, barium, copper, iron, lead, manganese, zinc, ammonium and tin salts. Organic bases are particularly amines such as pyridine, piperidine, cyclohexylamine, mono- and dialkyl cyclohexylamines, alkylolamines, mono- and dialkylamines, etc.

After formation of the aforementioned salts the products are freed of inorganic materials, in the event their method of preparation resulted in the formation or introduction of such salts by any of the customary processes or modifications thereof. This feature, as previously described, is advantageously carried out by heat treatment, under such conditions as to drive off water while at the same time preventing decomposition, cooling of the substantially or completely dehydrated product and filtration of the inorganic salts therefrom. In carrying out this method of freeing the products from inorganic salts it is ordinarily quite advantageous, although not essential, to conduct the treatment in the presence of one or more of the higher fatty alcohols previously referred to.

Since one of the prime objects of this invention is the production of oil-soluble emulsifying agents it is to be understood that when this is the purpose in view those of the aforementioned compounds which are readily soluble in oil should ordinarily be selected. Such oil-soluble compounds may readily be ascertained by simply shaking a small amount of any compound in question with the oil to be emulsified. If it is soluble it will form a clear solution with the oil. In this connection it may again be repeated that the various described salts of sulfated oleyl alcohol which has been treated with acetic anhydride prior to sulfonation are of particular efficacy.

In referring to the term "sulfonation" throughout the present specification and claims it is understood that such term is used in its generic sense to include the production of both true sulfonates and/or sulfuric acid esters. The latter are, in general, considerably superior for purposes of this invention than the true sulfonates.

The products produced in accordance with the aforementioned instructions are in general of exceptional value as emulsifying agents. They may be used in the emulsification of oil-like materials. By "oil-like materials" is meant mineral, animal, vegetable and/or synthetic oils, fats and/or waxes. These products or mixtures thereof may be added to any oil-like materials which have been emulsified in the prior art or are capable of being emulsified to produce self-emulsifying materials. In addition to the emulsifying agents referred to herein prior art emulsifying agents may also be added. Likewise, the presence of higher fatty alcohols is frequently advantageous, and is in general advisable, particularly where the product is to be used in the emulsification of mineral oils. Such alcohols are advisably those normal primary alcohols containing from eight to eighteen carbon atoms, of either saturated or unsaturated nature.

The products are of value in the textile field for spinning, weaving, finishing, coning, etc. purposes. These products are also especially adapted for use in the dry cleaning field where it is advisable to incorporate in mineral oil or organic solvents small amounts of water. In addition to the aforementioned uses it is contemplated that these products may be used in any process wherein the presence of emulsified oil-like materials is desirable. A few of such uses are, for example, in the production of water paints, carbon paper, coating mixtures, wire drawing or other metal processing lubricants, in the production of cosmetics and pharmaceuticals, etc.

As many apparently widely different embodiments of this invention may be made without departing from the spirit and scope thereof, it is to be understood that the invention is not limited to the specific embodiments thereof except as defined in the appended claims.

We claim:

1. A water-in-oil emulsion comprising a hydrocarbon dry cleaning solvent having dissolved therein a long chain aliphatic alcohol and an oil-soluble salt of the sulfuric acid ester of oleyl alcohol which has been acetylated prior to sulfonation, said ester being substantially free from inorganic salts and containing no more than a small amount of water.

2. A water-in-oil emulsion comprising a hydrocarbon dry cleaning solvent having dissolved therein a long chain aliphatic alcohol and the sodium salt of the sulfuric acid ester of oleyl alcohol which has been acetylated prior to sulfonation, said ester being substantially free from inorganic salts and containing no more than a small amount of water.

3. A water-in-oil emulsion useful for dry cleaning textile fabrics comprising a hydrocarbon dry cleaning solvent having dissolved therein a long chain aliphatic alcohol and the sodium salt of the sulfuric acid ester of oleyl acetate, said ester being substantially free from inorganic salts and water, said solvent having a small amount of water dispersed therein.

4. The emulsion defined in claim 3 wherein the dry cleaning solvent is Stoddard solvent.

5. A water-in-oil emulsion useful for dry cleaning textile fabrics comprising a hydrocarbon dry cleaning solvent having dissolved therein oleyl alcohol and the sodium salt of the sulfuric acid ester of oleyl acetate, said ester being substantially free from inorganic salts and water, said solvent having a small amount of water dispersed therein.

6. The emulsion defined in claim 5 wherein the dry cleaning solvent is Stoddard solvent.

7. A water-in-oil emulsion comprising a hydrocarbon oil, water, and a salt of the sulfuric acid ester of oleyl alcohol which has been acetylated prior to sulfation and which has been made oil soluble by the addition of a long chain alcohol.

8. An emulsion comprising a hydrocarbon oil phase, a water phase, and an emulsifying agent, said emulsifying agent comprising a long chain aliphatic alcohol and the sodium salt of the sulfuric acid ester of oleyl alcohol which has been acetylated prior to sulfonation.

SAMUEL LENHER.
LUTHER B. ARNOLD, Jr.